United States Patent
Dummett

(10) Patent No.: US 7,544,262 B2
(45) Date of Patent: *Jun. 9, 2009

(54) METHOD OF MAKING A DUNNAGE PLATFORM

(75) Inventor: Laurence W. Dummett, Henderson, NV (US)

(73) Assignee: Airdex International, Inc., Henderson, NV (US)

(*) Notice: Subject to any disclaimer, the term of this patent is extended or adjusted under 35 U.S.C. 154(b) by 51 days.

This patent is subject to a terminal disclaimer.

(21) Appl. No.: 11/617,578

(22) Filed: Dec. 28, 2006

(65) Prior Publication Data

US 2007/0102096 A1 May 10, 2007

Related U.S. Application Data

(60) Continuation of application No. 11/490,372, filed on Jul. 20, 2006, which is a continuation of application No. 10/921,903, filed on Aug. 20, 2004, now Pat. No. 7,128,797, which is a division of application No. 10/166,988, filed on Jun. 11, 2002, now Pat. No. 6,786,992.

(51) Int. Cl.
*B29C 51/00* (2006.01)

(52) U.S. Cl. .............. 156/212; 156/213; 156/245; 156/475; 156/479; 156/322; 108/901; 269/21; 269/22

(58) Field of Classification Search .......... 156/212, 156/245, 286, 202, 443, 468, 475, 479, 322, 156/213, 285, 308.2, 309.6, 309.9, 196, 201; 269/21–22; 108/57.25, 57.27, 901; 249/160, 249/189, 208; 264/553, 554, 319

See application file for complete search history.

(56) References Cited

U.S. PATENT DOCUMENTS

| 3,511,191 A | 5/1970 | Barry |
| 3,581,681 A | 6/1971 | Newton |

(Continued)

FOREIGN PATENT DOCUMENTS

CH 404185 6/1966

(Continued)

OTHER PUBLICATIONS

Kempfer, L., "Lighten the Load," Material Handling Management, pp. 26-31 (Aug. 2006).

*Primary Examiner*—Richard Crispino
*Assistant Examiner*—Christopher Schatz
(74) *Attorney, Agent, or Firm*—Fliesler Meyer LLP

(57) ABSTRACT

A dunnage platform is in the general shape of a rectangular slab with legs extending form one side. The dunnage platform is made from an expanded polystyrene core. A chemical combination process is used to chemically combine portion of the core proximal to its surface with high impact polystyrene. In a first of two parts of the combination process, the core is placed in a forming mold with one of its two sides and two thirds of its thickness extending therefrom. A heated sheet of high impact polystyrene is brought into contact with the portion of the core extending from the mold. In a similar manner, the other of the two sides of the core is made to extend from the forming mold for contact with a heated sheet of high impact polystyrene.

15 Claims, 6 Drawing Sheets

U.S. PATENT DOCUMENTS

| | | |
|---|---|---|
| 3,654,012 A | 4/1972 | Schlager |
| 3,903,023 A | 9/1975 | Boutillier |
| 4,397,246 A | 8/1983 | Ishida |
| 4,661,302 A | 4/1987 | Park |
| 4,705,811 A | 11/1987 | Park |
| 4,734,441 A | 3/1988 | Park |
| 4,796,540 A | 1/1989 | Pelfrey |
| 5,098,498 A | 3/1992 | Hale |
| 5,156,094 A | 10/1992 | Johansson |
| 5,266,396 A | 11/1993 | Howard |
| 5,362,436 A | 11/1994 | Wagner |
| 5,369,135 A | 11/1994 | Cambell |
| 5,401,456 A | 3/1995 | Alesi, Jr. |
| 5,417,167 A | 5/1995 | Sadr |
| 5,525,636 A | 6/1996 | Henn |
| 5,544,568 A | 8/1996 | Potgeiter |
| 5,555,980 A | 9/1996 | Johnston |
| 5,598,675 A | 2/1997 | Pruss |
| 5,601,912 A | 2/1997 | Ellingson |
| 5,685,644 A | 11/1997 | Taylor |
| 5,833,796 A | 11/1998 | Matich |
| 6,021,916 A | 2/2000 | Stolzman |
| 6,029,583 A | 2/2000 | LeTrudet |
| 6,076,693 A | 6/2000 | Reiter |
| 6,123,032 A | 9/2000 | Ohanesian |
| 6,191,228 B1 | 2/2001 | Nosker |
| 6,224,706 B1 | 5/2001 | Matich |
| 6,294,114 B1 | 9/2001 | Muirhead |
| 6,380,294 B1 | 4/2002 | Babinec |
| 6,395,791 B1 | 5/2002 | Chaudhary |
| 6,431,372 B1 | 8/2002 | Aoyama |
| 6,446,563 B1 | 9/2002 | Ohanesian |
| 6,458,232 B1 | 10/2002 | Valentinsson |
| 6,622,642 B2 | 9/2003 | Ohanesian |
| 6,659,020 B1 | 12/2003 | Ball |
| 6,745,703 B2 | 6/2004 | Torrey |
| 6,748,876 B2 | 6/2004 | Preisler |
| 6,786,992 B2 | 9/2004 | Dummett |
| 6,824,860 B2 | 11/2004 | Edwards |
| 6,941,877 B2 | 9/2005 | Dickner |
| 6,943,678 B2 | 9/2005 | Muirhead |
| 6,955,129 B2 | 10/2005 | Moore |
| 6,976,436 B1 | 12/2005 | Sugihara |
| 6,984,695 B2 | 1/2006 | Brown |
| 7,025,208 B2 | 4/2006 | Baker |
| D521,208 S | 5/2006 | France |
| 7,044,066 B1 | 5/2006 | Miller |
| 7,128,797 B2 | 10/2006 | Dummett |
| 2002/0015811 A1 | 2/2002 | Gusavage |
| 2004/0112907 A1 | 6/2004 | Donnelly |
| 2005/0108988 A1 | 5/2005 | Dickner |
| 2005/0263044 A1 | 12/2005 | Bearse |
| 2005/0274296 A1 | 12/2005 | Dickner |
| 2006/0090844 A1 | 5/2006 | Dummett |

FOREIGN PATENT DOCUMENTS

| | | |
|---|---|---|
| DE | 2045712 | 9/1970 |
| DE | 2045712 | 3/1972 |
| DE | 8429708.5 | 2/1985 |
| EP | 1 308 036 | 4/1970 |
| EP | 0 422 542 | 6/1990 |
| EP | 0 480 451 A1 | 10/1991 |
| EP | 0 480 451 | 4/1992 |
| EP | 0 520 508 | 6/1992 |
| EP | 1 500 599 A1 | 7/2003 |
| GB | 1308036 | 2/1973 |
| WO | 95/23682 | 9/1995 |
| WO | WO 95/23682 | 9/1995 |
| WO | WO 02/38471 | 5/2002 |
| WO | WO 03/099668 | 12/2003 |
| WO | WO 03/099676 | 12/2003 |
| WO | WO 03/099689 | 12/2003 |
| WO | WO 2004/026713 | 4/2004 |
| WO | WO 2005/105590 | 11/2005 |
| WO | WO 2005/105599 | 11/2005 |

METHOD OF MAKING A DUNNAGE PLATFORM

CLAIM OF PRIORITY

This application is a continuation of and claims priority to U.S. patent application Ser. No. 11/490,372, filed Jul. 20, 2006 which application is a continuation of U.S. patent application Ser. No. 10/921,903, filed Aug. 20, 2004, and which issued as U.S. Pat. No. 7,128,797 on Oct. 31, 2006, which application is a divisional of U.S. patent application Ser. No. 10/166,988, filed Jun. 11, 2002, and which issued as U.S. Pat. No. 6,786,992 on Sep. 7, 2004. This application is herein expressly incorporated by reference in its entirety.

BACKGROUND OF THE INVENTION

1. Field of the Invention

This invention is in the general field of load-bearing structures and, more particularly, is a load bearing structure made from an expanded polystyrene core that is chemically combined with high impact polystyrene.

2. Description of the Prior Art

A shipping pallet is a well known load-bearing, moveable platform whereon articles are placed for shipment. The pallet usually is loaded with a multiplicity of items, such as cartons or boxes. The loaded pallet is movable with either a pallet truck or a forklift There is a nine billion dollar market for pallets in the United States. There is a thirty billion dollar world wide market. Approximately ninety percent of these markets is for pallets made from wood.

The weight of the wood pallet is in a range of forty to seventy pounds. Therefore, the weight of a cargo shipped on the wood pallet is reduced by from forty to seventy pounds to provide for the weight of the wood pallet.

It should be understood that injuries caused by wood splinters and nails are frequent occurrences among people who handle the wood pallet. Additionally, disposal of the wood pallet at the end of its useful life is a threat to the environment.

There has been concern among nations about the use of the wood pallet causing an import of wood-boring insects, including the Asian Longhorned Beetle, the Asian Cerambycid Beetle, the Pine Wood Nematode, the Pine Wilt Nematode and the Anoplophora Glapripwnnis. Exemplary of damage caused by imported insects is the fate of the Chestnut Tree in the United States. There was a time when it was said that a squirrel could cross the United States on Chestnut Tree limbs without ever touching the ground. Insect infestation has caused the extinction of the Chestnut Tree in the United States.

Therefore, the wood pallet's weight, the injuries that it causes, its threat to the environment and the possibility of it causing an importation of wood-boring insects militates against the use of the wood pallet. As explained hereinafter, there is an attractive alternative to the wood pallet.

SUMMARY OF THE INVENTION

An object of the invention is an easily movable load bearing structure that is not likely to carry wood-boring insects.

Another object of the invention is a movable load bearing structure that does not have splinters and nails that may cause injury.

According to the present invention, a dunnage platform has an expanded polystyrene core with a region proximal to its surface that is chemically combined with a high impact polystyrene.

Because of a chemical combination of components, comparing the core before the chemical combination to the dunnage platform that is formed, there is an increase in strength to weight ratio of as much as 1000:1 that allows the dunnage platform to carry loads comparable to loads carried by a wooden pallet. The dunnage platform does not support insect life and does not have splinters and nails that cause injury.

Other objects, features and advantages of the invention should be apparent from the following description of a preferred embodiment thereof as illustrated in the accompanying drawing.

DESCRIPTION OF THE PREFERRED EMBODIMENT

Figure 1:
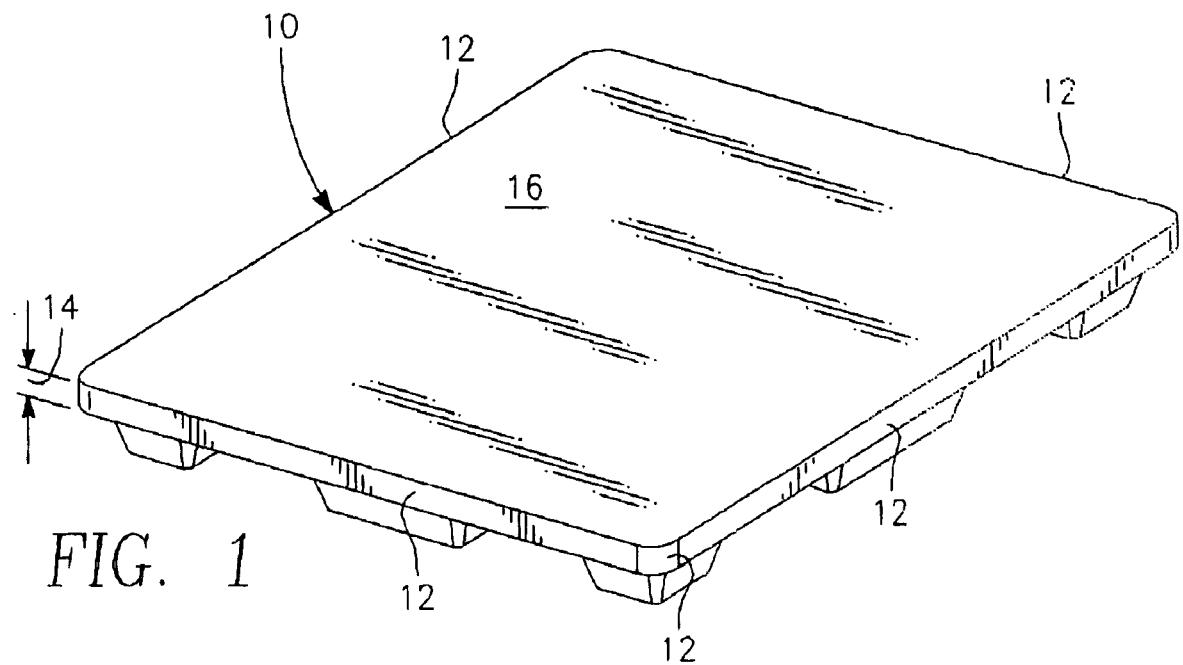
FIG. 1 is a perspective view of a top side of a core of a dunnage platform that is in accordance with the invention.
Figure 2:
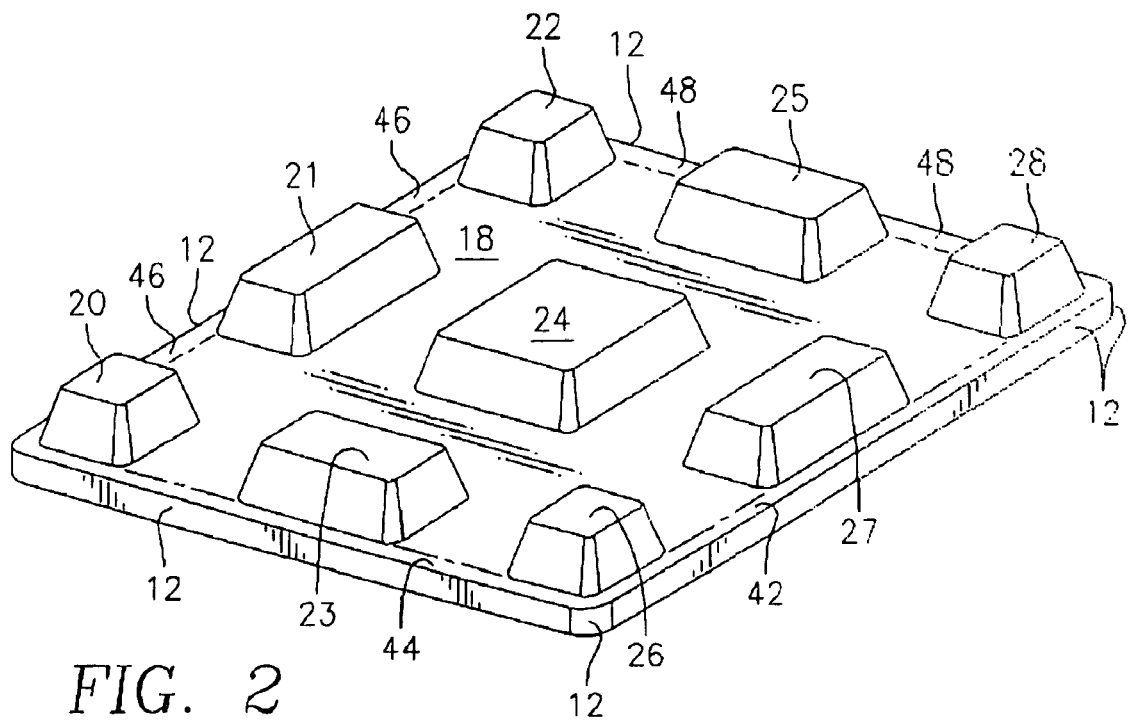
FIG. 2 is a perspective view of a bottom side of the core of FIG. 1.

As shown in FIGS. 1 and 2, an expanded polystyrene core 10 is in the general shape of a rectangular slab with an edge 12 (FIG. 1) that has a width 14 which is approximately 1¾ inches. The core 10 has a smooth topside 16 that is on the order of forty eight inches long and forty inches wide. A bottom side 18 (FIG. 2) of the core 10 includes legs 20-28 approximately four inches long extending therefrom.

The edge 12 is proximal to ma spaces 42, 44, 46, 48 on the bottom side 18. The marginal spaces 42, 44, 46, 48 separate the legs 26-28, the legs 20, 2326, the legs 20-22 and the legs 22, 25, 28, respectively, from the edge 12.

Because the core 10 is made from expanded polystyrene, it does not have sufficient structural strength to be useable as a load bearing platform. A dunnage platform with sufficient strength is formed by chemically combining a region of the core 10, proximal to its surface, with a high impact polystyrene. Expanded polystyrene and high impact polystyrene are well known. The dunnage platform described hereinafter has substantially the same dimensions as the core 10.

A first of two parts of a chemical combination process causes portions of the expanded polystyrene proximal to the bottom side 18 to be chemically combined with the high impact polystyrene to form strengthened polystyrene. Additionally, a portion of the expanded polystyrene that is proximal to the edge 12 and in a proximal relationship to the bottom side 18 is chemically combined with the high impact polystyrene to form the strengthened polystyrene.

Figure 3:
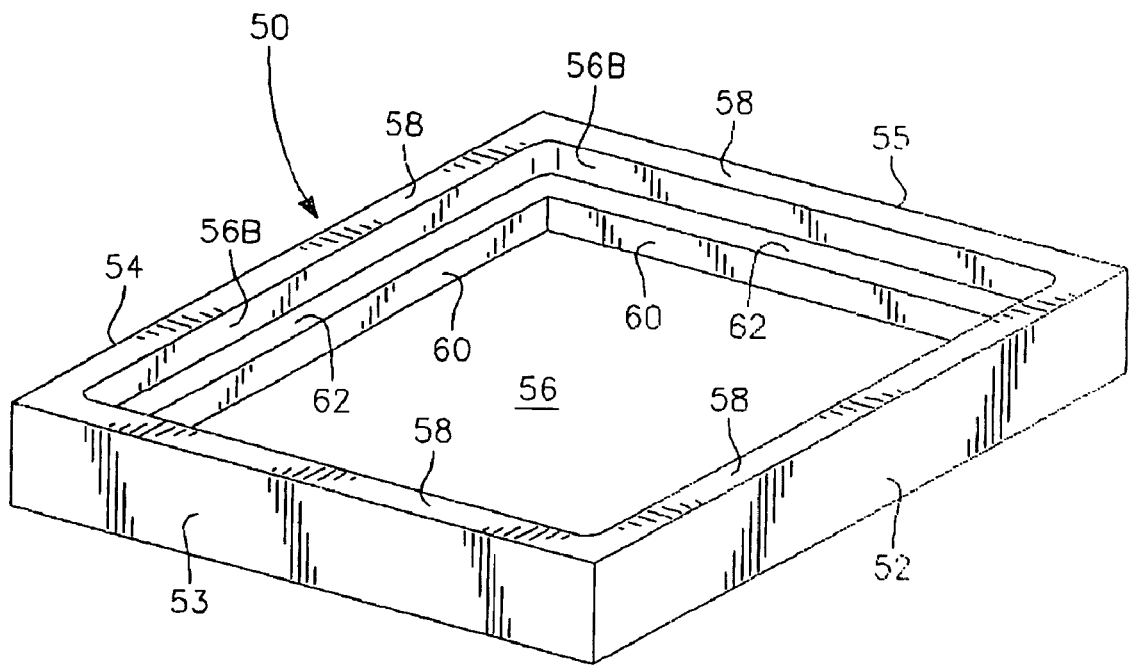
FIG. 3 is a perspective view of a forming mold.

As shown in FIG. 3, a forming mold 50 has rectangularly disposed walls 52-55 that define an interior 56 and a top surface 58. An interior surface 56U of the walls 52-55 outline a portion of the interior 56 that is complimentary to a shape of the core 10 outlined by the edge 12.

An interior of the walls 52-55 form a shelf 60 that extends around the interior 56. The shelf 60 has a surface 62 that is parallel to the surface 58. For reason's explained hereinafter, a displacement between the surfaces 58, 62 is less than one half of the width 14 (FIG. 1). In this embodiment, the displacement between the surfaces 58, 62 is one third of the width 14.

Figure 4:
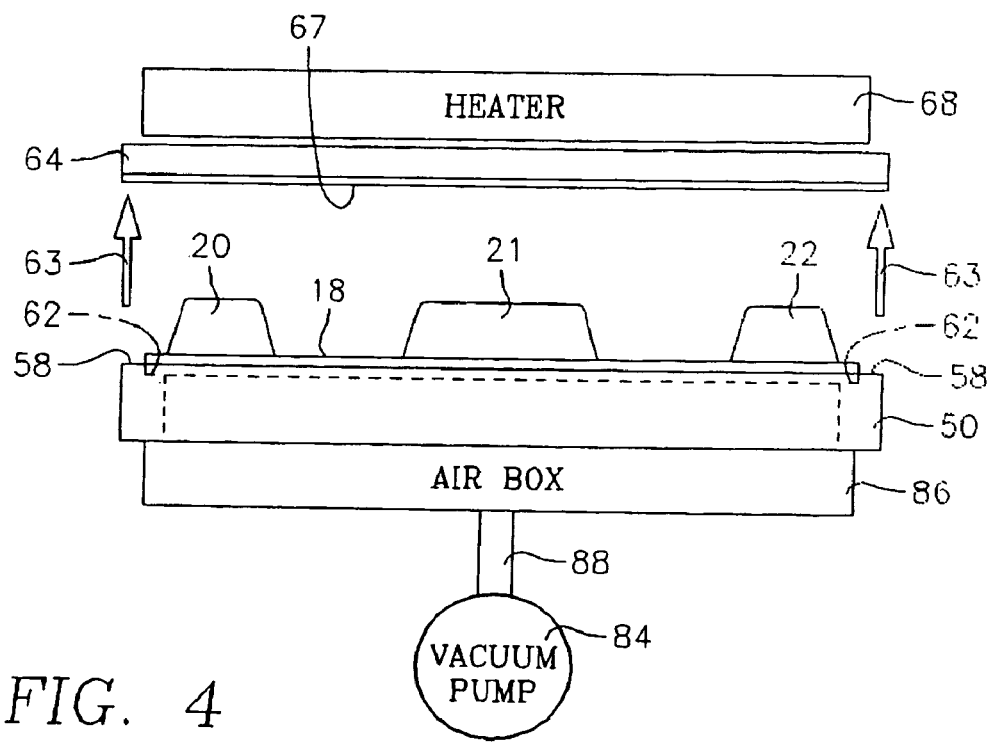
FIG. 4 is a side elevation of the core of FIG. 1 within the forming mold of FIG. 3 positioned below a clamping frame with a first high impact polystyrene sheet clamped therein in preparation for a first of two parts of a chemical combination process.

As shown in FIG. 4, the mold 50 is moveable in a direction of the arrows 63. The core 10 is retained within the mold 50 with a marginal portion of the top side 16 that is proximal to the edge 12 is seated upon the surface 62 (FIG. 3) whereby the top side 16 is maintained within the mold 50. Since the distance between the surfaces 58, 62 is one third of the width 14, two thirds of the edge 12 extends from the mold 50. Additionally, the bottom side 18 extends from the mold 50.

A fixedly positioned clamping frame 64 has a first high impact polystyrene sheet 67 clamped therein. A heater 68 is positioned proximal to the frame 64.

Figure 5:
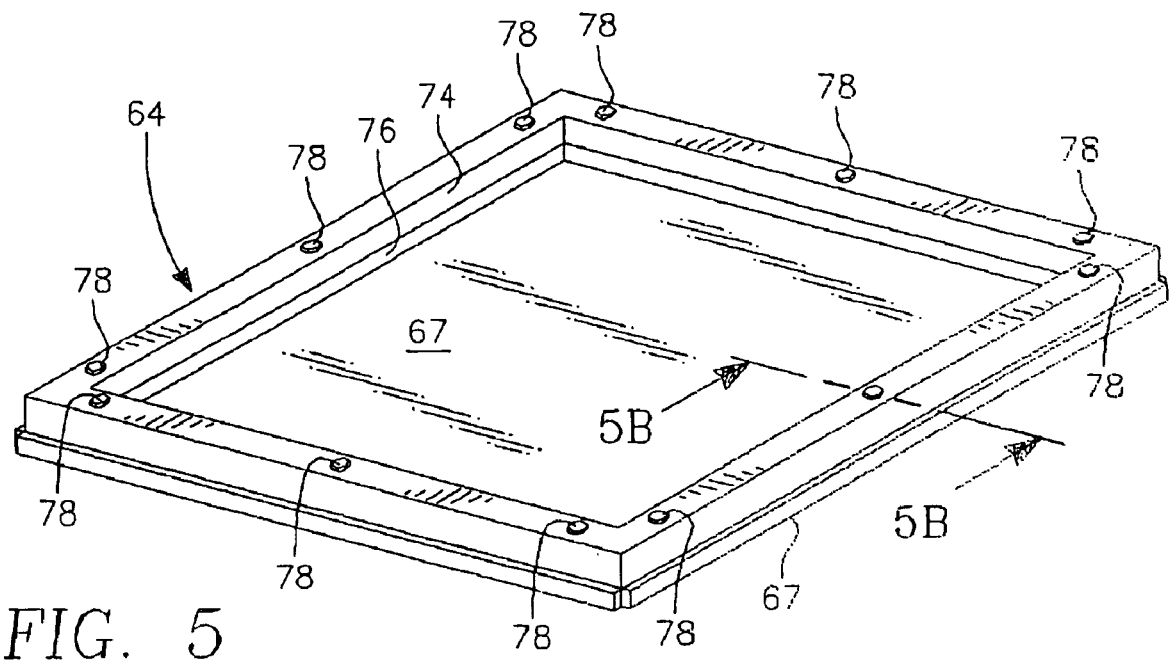
FIG. 5 is a perspective view of the clamping frame and the first sheet of FIG. 4.

As shown in FIG. 5, the frame 64 is made from an upper rectangular frame 74 and a lower rectangular frame 76 that are held together by a plurality of screws 78. The length and width of the upper frame 74 is substantially equal to the length and width, respectively, of the lower frame 76.

Figure 5A:
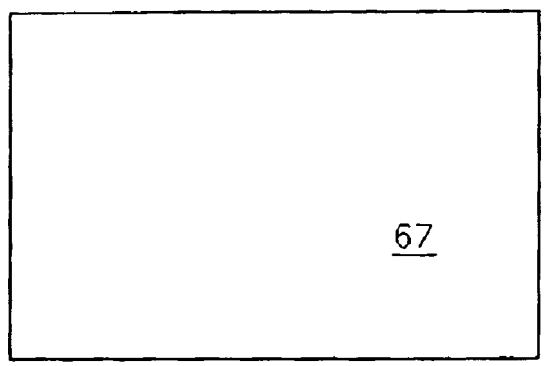
FIG. 5A is a plan view of the first sheet of FIG. 3.
Figure 5B:
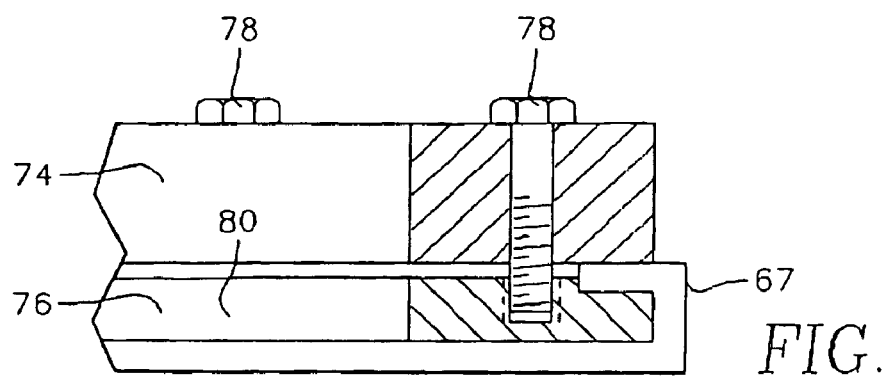
FIG. 5B is a view of FIG. 5 taken along the line 5B-5B.

As shown in FIGS. 5A, and 5B, with the screws 78 not tightened, edges of the sheet 67 (FIG. 5A) are inserted between the frames 74, 76 (FIG. 5B) in much the same way that edges of a bed sheet are inserted between a mattress and a box spring. At corners of the frames 74, 76, the sheet 67 is folded in much the same way that edges of the bed sheet are folded to form what is known as a hospital corner and inserted between the frames 74, 76. When the edges and corners of the sheet 67 are inserted, the sheet 67 extends in a plane that causes it to cover a side 80 of the frame 76. Thereafter, the screws 78 are tightened whereby the sheet 67 is fixedly maintained in the frame 64.

Figure 6:
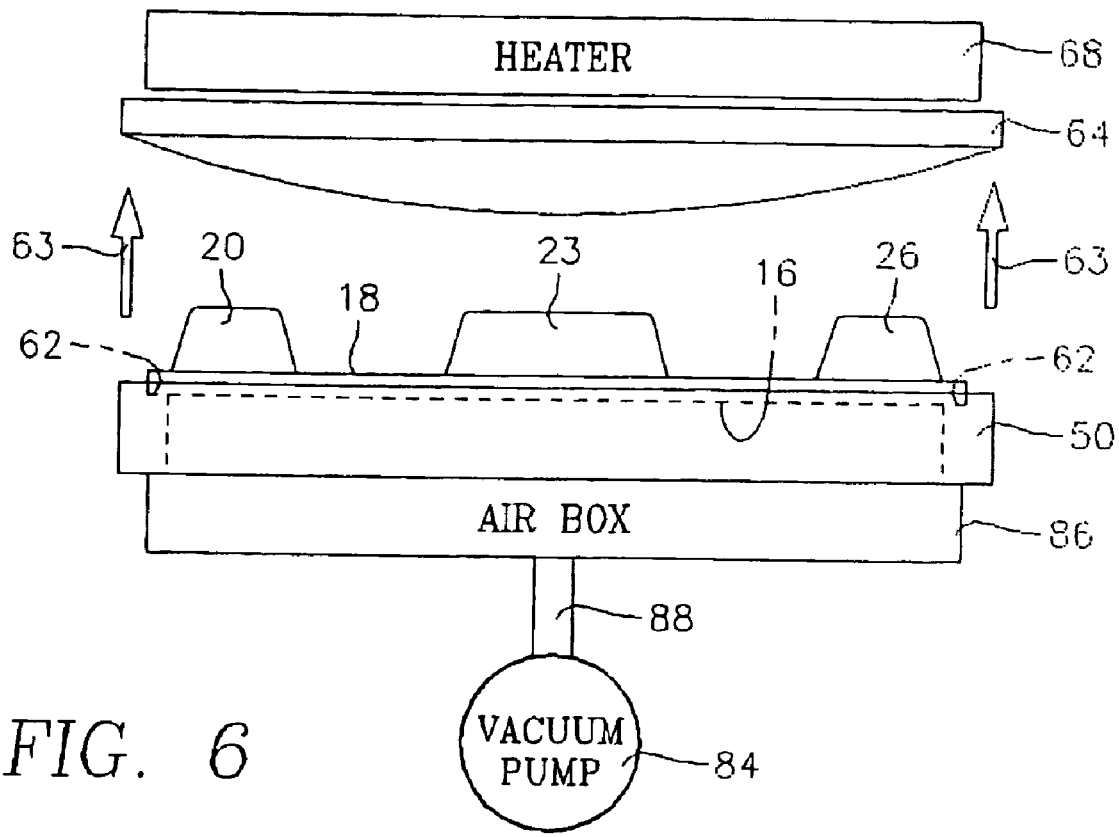
FIG. 6 is a side elevation of the core of within the forming mold of FIG. 3 positioned below the clamping frame after the first sheet has been heated.

As shown in FIG. 6, in the first part of the process, the heater 68 heats the sheet 67 to a temperature in a range of 293.degree. F. to 375.degree. F. In response to being heated, the sheet 67 characteristically sags. After the sheet 67 is heated, the heater 68 is removed and the mold 50 is moved in a direction of the arrows 63.

It should be understood that when the sheet 67 is heated, it becomes fragile. Because the frame 64 is fixedly positioned, a risk of damage to the sheet 67 is minimized.

Figure 7:
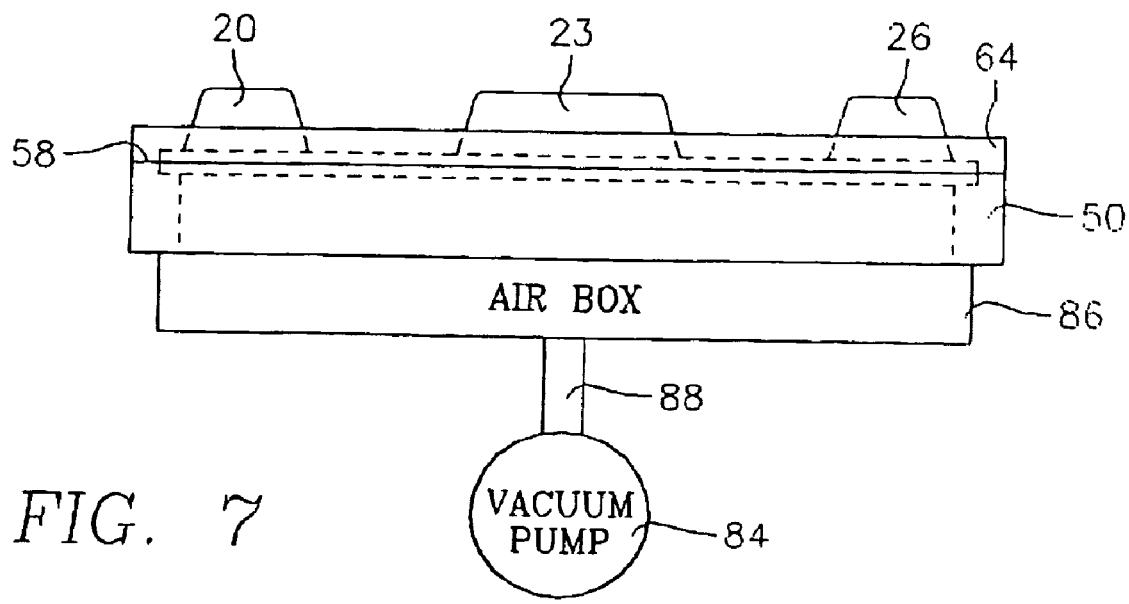
FIG. 7 is a side elevation of the clamping frame seated upon a marginal portion of the bottom side of the core.

As shown in FIG. 7, the mold 50 is moved until a portion of the heated sheet 67 that covers the side 80 (FIG. 5B) is seated upon the surface 58 (FIG. 3). The mold 50 is connected to a vacuum pump 84 through an air box 86 and a connector line 88.

It should be understood that the core 10 is porous. When the vacuum pump 84 operates, air may pass through the core 10, from the top side 16, to the pump 84. The heated sheet 67 is not porous, thereby causing one atmosphere of air pressure that draws the heated sheet 67 onto the bottom side 18 and the two thirds of the edge 12 that extends from the mold 50.

The expanded polystyrene proximal to the bottom side 18 and proximal to the two thirds of the edge 12 that extend above the mold 50 chemically combine with the high impact polystyrene of the sheet 67 to form the strengthened polystyrene. The strengthened polystyrene is not porous. The side 18 and the legs 20-28 with the strengthened polystyrene proximal to their surface are hereinafter referred to as a side 18C with legs 20C-28C, respectively.

Figure 8:
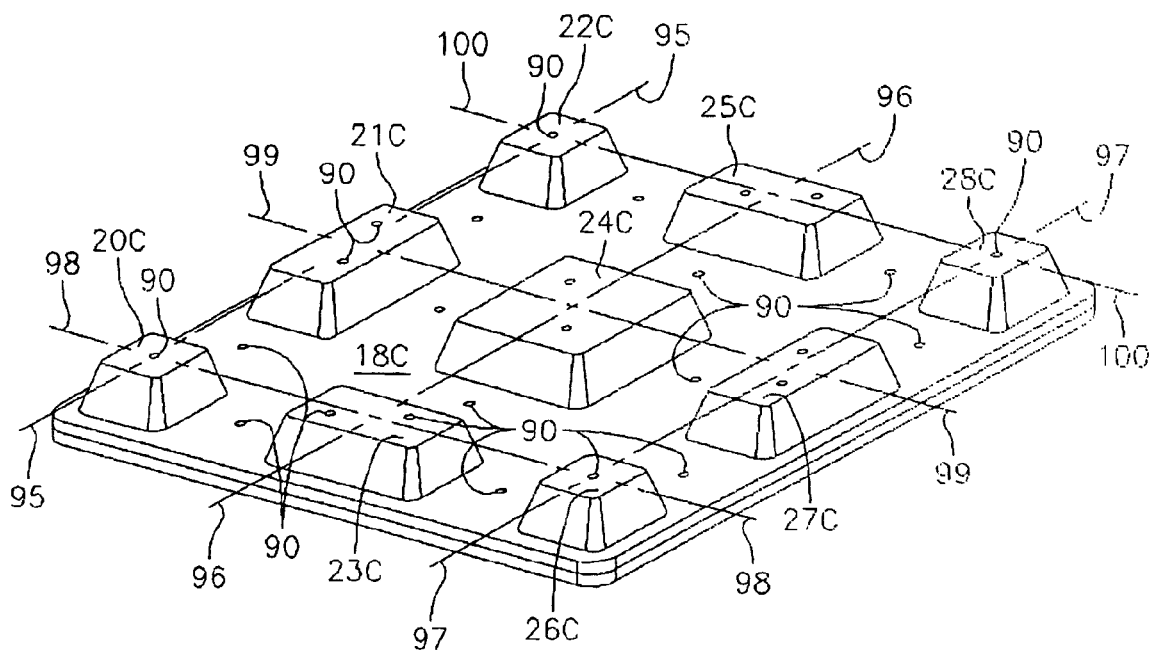
FIG. 8 is a perspective view of the bottom side wherein holes have been drilled through strengthened polystyrene.

As shown in FIG. 8, because the strengthened polystyrene is not porous, a plurality of holes 90 are drilled into the side 18C to approximate the porosity of expanded polystyrene.

Figure 9:
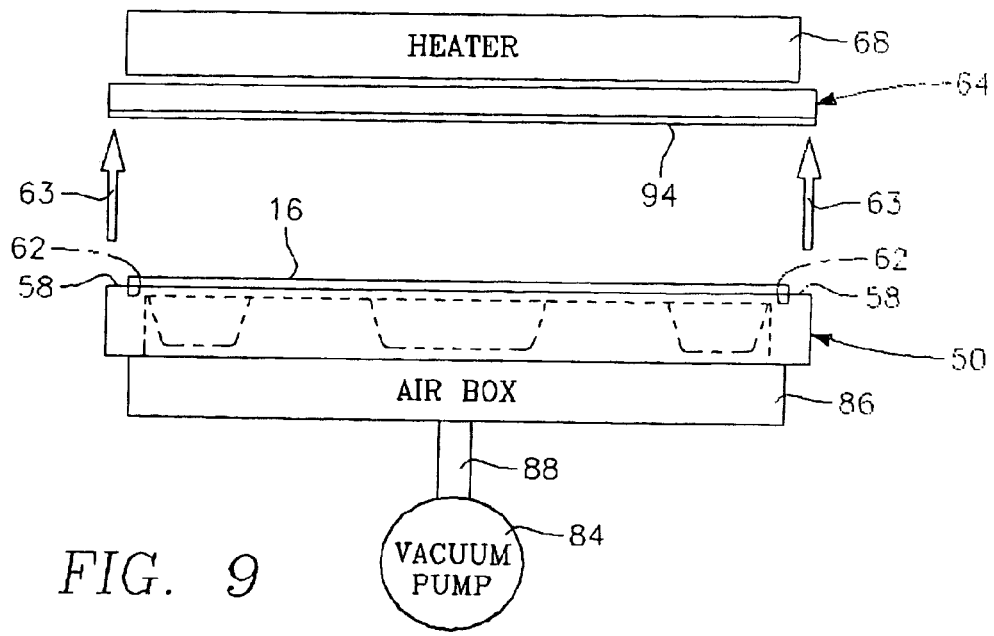
FIG. 9 is a side elevation of the core within the forming mold positioned below the clamping frame with a second high impact polystyrene sheet clamped therein in preparation for the second part of the chemical combination process.

As shown in FIG. 9, in a second part of the process, the side 18C is retained within the mold 50 with the marginal spaces 42, 44, 46, 48 (FIG. 2) seated upon the surface 62. Since the displacement between the surfaces 58, 62 is one third of the width 14, two thirds of the edge 12 extends from the mold 50. It should be understood that during the second part of the process, the two thirds of the edge 12 that extends from the mold 50 includes one third of the edge 12 that did not extend from the mold 50 during the first part of the process.

The frame 64 frames a second high impact polystyrene sheet 94, similar to the sheet 67. The frame 64 with the sheet 94 is fixedly positioned above the mold 50. The heater 68 is positioned proximal to the fame 64.

Figure 10:
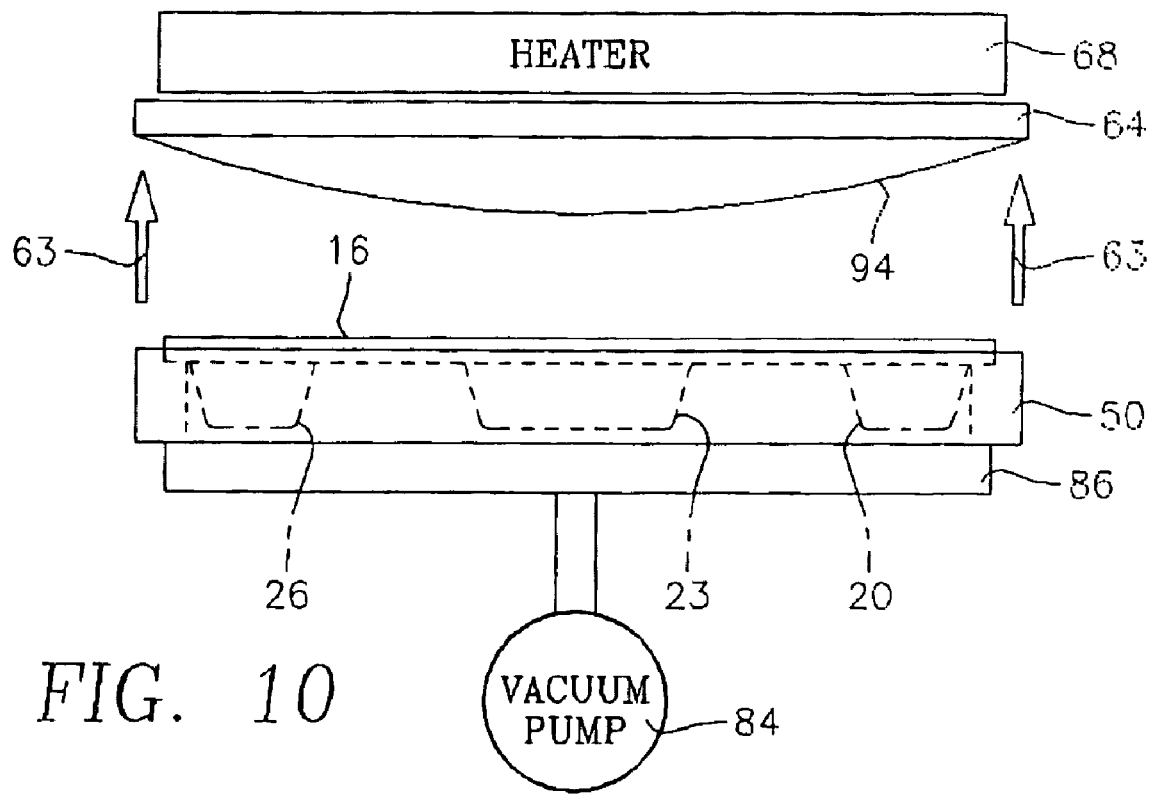
FIG. 10 is a side elevation of the core within the forming mold positioned below the clamping frame after the second sheet has been heated.

As shown in FIG. 10, the heater 68 is used to heat the sheet 94 and the frame 64 mold 50 is moved in a direction of the arrows 63 in a manner similar to that described in connection with the first part of the process.

Figure 11:
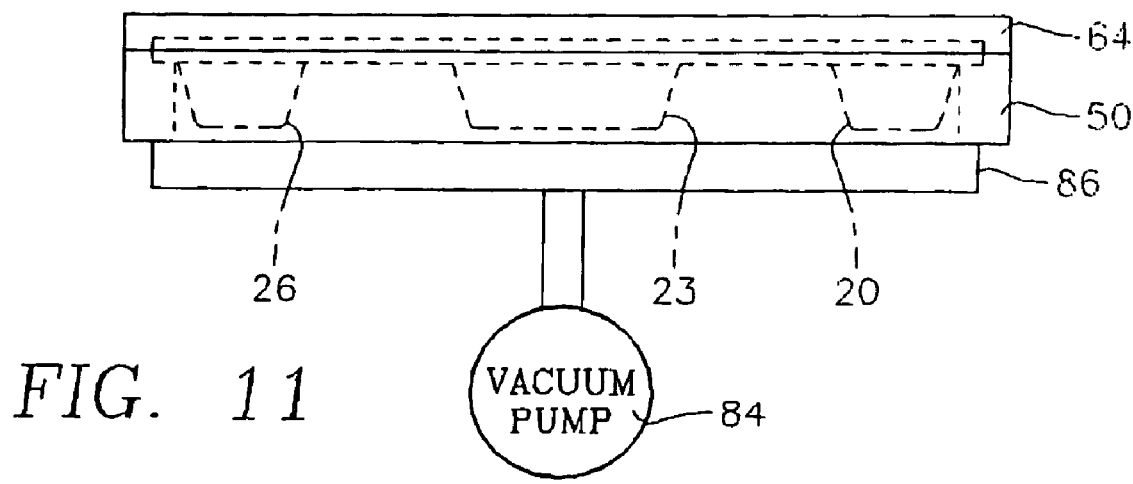
FIG. 11 is a side elevation of the clamping frame of FIG. 10 seated upon a marginal portion of the top side of the core.

As shown in FIG. 11, the mold 50 is moved until a portion of the sheet 94 that covers the surface 80 (FIG. 5B) is seated upon the surface 58. Because of the holes 90 (FIG. 8), when the vacuum pump 84 operates, air may pass to the pump 84. However, the sheet 94 is not porous, thereby causing one atmosphere of air pressure to draw the sheet 94 onto the top side 16. Since the sheet 94 is connected to the frame 64 as described hereinbefore, all portions of the core 10 that extend above the mold 50 contact the sheet 94.

In accordance with the second part of the process, the expanded polystyrene proximal to the portions of the surface of core 10 that extends from the mold 50 chemically combines with the high impact polystyrene of the sheet 94 to form the strengthened polystyrene. Moreover, because the displacement between the surfaces 58, 62 is less than one half of the width 14, the strengthened polystyrene is formed proximal to the entire edge 12.

The dunnage platform formed by the process weighs approximately eight pounds and can carry an approximately 3500 pound load.

As shown in FIG. 8 the legs 20C-22C, the legs 23C-25C and the legs 26C-28C are arranged in parallel columns 95-97, respectively. The columns 95-97 are spaced so that tines of a fork lift can fit between the columns 95, 96 and between the columns 96, 97. Accordingly, with the tines parallel to the columns 95-97, the fork lift can lift the dunnage platform from either of two sides.

Similarly, the legs 20C, 23C, 26C, and the legs 21C, 24C, 27C and the legs 22C, 25C, 28C are arranged in parallel rows 98-100, respectively, that are orthogonal to the columns 95-97. The rows 98-100 are spaced so that tines of a fork lift can fit between the rows 98, 99 and between the rows 99, 100. Accordingly, with the tines parallel to the columns 98-100, the fork lift can lift the dunnage platform from either of two sides.

While the invention has been particularly shown and described with reference to a preferred embodiment, it should be understood by those skilled in the art that changes in form and detail may be made therein without departing from the spirit and scope of the invention.

I claim:

1. A process for making a strengthened polystyrene load bearing structure, comprising the steps of:
   providing a forming mold adapted to receive an expanded polystyrene core, wherein said polystyrene core has been inserted into the forming mold, where a first side of the expanded polystyrene core and at least half the thickness of the expanded polystyrene core have been combined with a first high impact polystyrene sheet, wherein the polystyrene core has been removed from the forming mold;
   reinserting the expanded polystyrene core in the forming mold, wherein a second side of the expanded polystyrene core and at least half the thickness of the expanded polystyrene core extend from the mold;
   heating a second high impact polystyrene sheet; and combining the second side and at least half the thickness of the expanded polystyrene core with the second high impact polystyrene sheet.

2. The process of claim 1, wherein the high impact polystyrene sheet is heated to a temperature in a range of between:
   293° F.; and
   375° F.

3. The process of claim 1, further comprising applying reduced pressure to mold the heated high impact polystyrene sheet to the expanded polystyrene core.

4. The process of claim 1, wherein the high impact polystyrene sheet is chemically combined with the expanded polystyrene core.

5. The process of claim 1, further comprising the steps of:
   placing the expanded polystyrene core in proximity of the high impact polystyrene sheets; and
   moving said expanded polystyrene core into contact with said heated high impact polystyrene sheet, wherein said heated high impact polystyrene sheet remains fixed in position.

6. The process of claim 1, wherein said first and said second high impact polystyrene sheets and said expanded polystyrene core are chemically combined at a reduced pressure and increased temperature.

7. The process of claim 1, wherein the expanded polystyrene core is substantially surrounded with the first and second high impact polystyrene sheets.

8. A process for making a strengthened polystyrene load bearing structure, comprising the steps of:
   providing a forming mold adapted to hold an expanded polystyrene core from a first side and a second side;
   retaining said expanded polystyrene core within the forming mold with the first side of the expanded polystyrene core and at least half the thickness of the expanded polystyrene core extending therefrom;
   heating a first high impact polystyrene sheet; and
   combining the first sheet with the first side of the expanded polystyrene core, wherein portions of said expanded polystyrene core that extend from said mold contact said sheet;
   removing the expanded polystyrene core from the forming mold and reinserting the expanded polystyrene core in the forming mold, wherein a second side of the expanded polystyrene core and at least half the thickness of the core extend therefrom;
   heating a second high impact polystyrene sheet; and combining the second side and at least half the thickness of the expanded polystyrene core with the second high impact polystyrene sheet.

9. The process of claim 8, wherein one or both of the first and second high impact polystyrene sheets are heated to a temperature in a range of between:
   293° F.; and
   375° F.

10. The process of claim 8, further comprising applying reduced pressure to mold one or both of the first and second heated high impact polystyrene sheets to the expanded polystyrene core.

11. The process of claim 8, wherein one or both of the first and second high impact polystyrene sheets are chemically combined with the expanded polystyrene core.

12. The process of claim 8, further comprising the steps of:
   placing the expanded polystyrene core in proximity of one or both of the first and second high impact polystyrene sheets; and
   moving said expanded polystyrene core into contact with one or both of the first and second high impact polystyrene sheets; wherein one or both of the first and second high impact polystyrene sheets remains fixed in position.

13. The process of claim 8, wherein said first and said second sheets are proximal to each other around the same expanded polystyrene core.

14. The process of claim 8, wherein said first and said second high impact polystyrene sheets and said expanded polystyrene core are chemically combined at a reduced pressure and increased temperature.

15. The process of claim 1, wherein the high impact polystyrene sheet is combined with two thirds of the thickness of the expanded polystyrene core.

\* \* \* \* \*